April 20, 1965 F. J. KOZACKA 3,179,853
INTEGRAL SEMICONDUCTOR DIODE AND DIODE-FUSE UNIT
Filed Feb. 29, 1960
FIG. 1
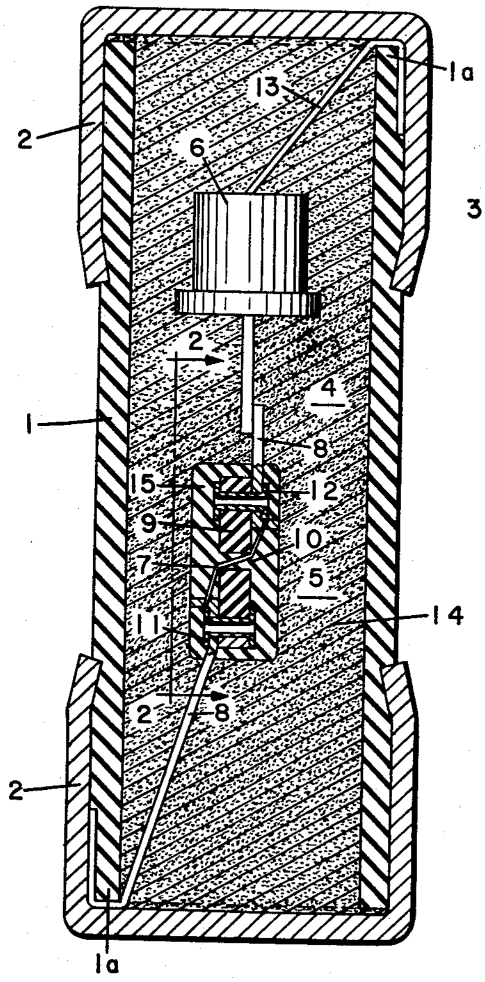
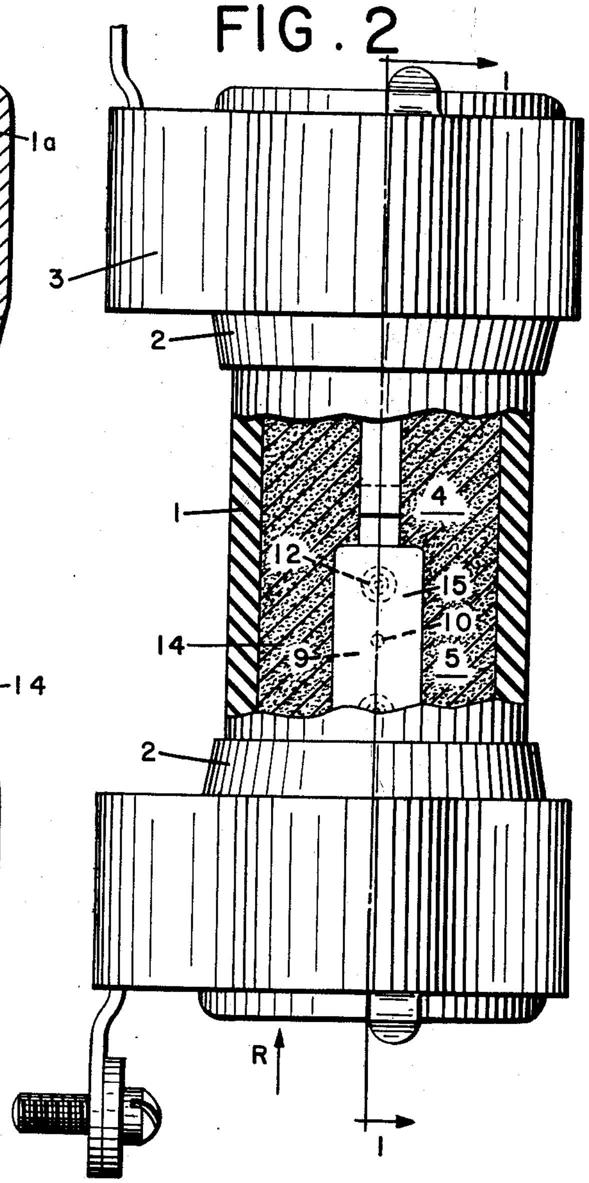
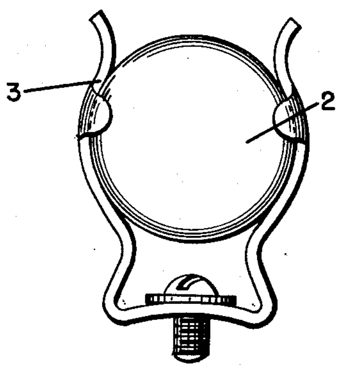
FIG. 3
INVENTOR.
Frederick J. Kozacka
BY
by Erwin Salzer atty.

United States Patent Office 3,179,853
Patented Apr. 20, 1965

3,179,853

INTEGRAL SEMICONDUCTOR DIODE AND DIODE-FUSE UNIT

Frederick J. Kozacka, South Hampton, N.H., assignor to The Chase-Shawmut Company, Newburyport, Mass.
Filed Feb. 29, 1960, Ser. No. 11,776
6 Claims. (Cl. 317—100)

This invention relates to semiconductor rectifier devices including semiconductor diodes and transistors.

Devices of this description are subject to a sudden breakdown of their inverse voltage, i.e. their ability to inhibit the flow of inverse currents. Such a breakdown is equivalent to a short-circuit. This calls for the provision of special fuses known as cell fuses for protecting other pieces of equipment in the faulted circuit from the results of a cell breakdown. Considering germanium or silicon diodes, such rectifier devices cannot carry excess currents as small as three to five times the rated current of a cell for more than about one cycle of a current wave of 60 c.p.s. without being damaged. In rectifier circuits where the breakdown of a cell subjects identical cells to excess currents, the cell fuse associated with each cell must be sufficiently fast to protect other cells from thermal damage. This calls for a critical matching of cell fuses and rectifier cells. Many service men in the field are not aware, and do not sufficiently understand, the rules and the theory of matching of cells and of cell fuses. As a result of mismatching of cells and cell fuses often great damage results in circuitry involving the use of semiconductor current control devices.

It is, therefore, one object of this invention to provide fool proof means for the protection of semiconductor current control devices doing away with the critical task of matching cells and cell fuses in the field.

Another object of the invention is to provide self-protected semiconductor rectifier devices which are less bulky than matched pairs of cells and cell fuses as heretofore applied in the art.

Another object of the invention is to provide integrated cell and cell fuse units wherein a common means is used for dissipating the heat generated in the rectifier cell and for quenching the arc incident upon blowing of the cell fuse.

Other objects of the invention and advantages thereof will, in part, be obvious and in part appear hereinafter.

For a more complete understanding of the invention reference may be had to the following detailed description thereof taken in connection with the accompanying drawings wherein—

FIG. 1 is a longitudinal section along 1—1 of FIG. 2 showing a self-protected semi-conductor diode embodying the invention;

FIG. 2 is partly a section along 2—2 of FIG. 1 and partly a side elevation of the structure of FIG. 1 inserted in a pair of clips; and FIG. 3 is an end view of the structure of FIGS. 1 and 2 seen in the direction of the arrow R in FIG. 2.

All figures show the structure in considerable magnification, FIG. 3 in smaller magnification than FIGS. 1 and 2.

Referring now to the drawings, numeral 1 has been applied to indicate a tubular casing of an electric insulating material. It is important that casing 1 be made of an insulating material which is a good conductor of heat, i.e. which has a relatively high thermal conductivity. Casing 1 may be made of a suitable synthetic resin-glass-cloth laminate as, for instance, a laminate of melamin resin and glass cloth. Casing 1 is closed on both ends thereof by metallic terminal elements or ferrules 2 adapted to be received by clips 3 (FIGS. 2 and 3). Ferrules 2 are conductively connected by a conductor means generally indicated by reference character 4. Conductor means 4 extends substantially in a direction longitudinally of casing 1 and includes a fusible protective device 5 and a serially connected semiconductor rectifier device 6. Both devices 5 and 6 are thus accommodated inside of casing 1 and are integrated by casing 1 into a unit structure. The fusible protective device 5 comprises a short length of silver wire 7 having extensions 8 of copper having a relatively large cross-sectional area. Plate 9 consists of an electric insulating material and is provided with a bore or narrow passageway 10 through which silver wire 7 extends. Eyelets or similar fasteners 11 and 12 project through plate 9 and secure axial copper extensions 8 to plate 9. The lower copper extension 8 is bent around the lower circular edge 1*a* of casing 1 to the outer surface of casing 1 and held in position by the lower ferrule 2. Normally the pressure between ferrule 2 and extension 8 is sufficient to establish a satisfactory current carrying connection between extension 8 and ferrule 2. If desired, the end of extension 8 may slightly project beyond the inner surface of ferrule 2, turn 180 degrees to the outer surface thereof and be spot-welded to the outer surface. The diode 6 is provided with an upper lead 13 bent around the upper circular edge 1*a* of casing 1 to the outer surface thereof and maintained in position by the upper ferrule 2. Casing 1 is filled with quartz sand 14 which is a filler having a relatively high thermal conductivity. This filler has two functions. It conducts the heat generated in the diode or transistor device 6 to the casing 1, from where it is further readily dissipated by convection on account of the relatively high thermal conductivity of casing 1. The other function of filler 14 is to de-ionize the products of arcing formed upon fusion of silver wire 7. Reference numeral 15 has been applied to indicate a body of a normally solid organic insulating material liquefying and vaporizing under the heat of an arc. Body 15 may consist of a thermoplastic synthetic resin as, for instance, an epoxy resin. Body 15 fills and plugs the bore 10 and separates the portion of silver wire 7 inside of bore 10 from the pulverulent filler 14. The axially inner ends of conductors 8 are hook-shaped and the ends of wire 7 are wound around these hook shaped ends and secured to the same by solder joints (not shown). Wire 7 has end portions situated outside of bore 10 adjacent the surfaces of plate 9. These end portions are embedded in the body 15 of thermoplastic material.

Under normal operating conditions filler 14 and casing 1 operate jointly as dissipators for the heat generated in semiconductor diode 6, and thus assume the function performed by cooling fins in conventional semiconductor rectifiers. While some semiconductor rectifiers call for heat exchangers which are more effective than casing 1 and filler 14, these heat exchange means are sufficient in many instances, particularly where casing 1 is exposed to natural or forced draft and/or where the heat generated by semiconductor rectifier cell 6 is relatively small.

Wire 7 will fuse if and when the semiconductor diode 5 breaks down. The extreme thinness of silver wire 7 permits to achieve the speed of blowing required to match the total melting and arcing $i^2 \cdot t$ value of the fuse with the damage $i^2 \cdot t$ value of the cell 6, or of an identical cell, respectively. The body 15 of insulating material precludes the arc formed within bore or passageway 10 upon fusion of wire 7 to act directly upon the arc quenching quartz filler 14 and to cause the latter to form an arc-path-shunting fulgurite. Upon fusion of wire 7 the matter of which body 15 is formed forms a bubble in which the arc burns. As long as that bubble is intact, the arc is still effectively separated from the surrounding quartz sand. When the bubble bursts on account of the magnitude of the pressure prevailing therein, and body 15 is cracked or broken, a pair of axial jets of products of arcing issue out of passage 10 into the quartz filler 14, where they are instantly cooled by the latter. These two jets formed by products of arcing form fulgurites at the points where they issue from passage 10. Since these fulgurites are spaced from the arc path they do not shunt the arc gap, and are not conducive to extended arcing and to post current zero currents. If the arc formed in bore 10 is not instantly extinguished by the blasts of gas issuing from that bore, there with be back-burning of the end portions of wire 7 outside of bore 10 adjacent the surfaces of plate 9. The body 15 of synthetic resin embedding these end portions forms effective barriers against back-burning toward the hook shaped axially inner ends of conductors 3. The arc terminals on wire 7 are enveloped in turbulent jets of gas issuing from the embedding resin body 15, tending to effect rapid arc extinction.

Where the place of diode 6 is taken by a transistor sharing the casing 1 of the fuse 5, means must be provided for a third electric terminal. Such a terminal may extend through a bushing in casing 1.

While, in accordance with the patent statutes, I have disclosed the specific details of a preferred embodiment of the invention, it is to be understood that these details are merely illustrative and that many variations thereof may be made without departing from the spirit and scope of the invention. It is my desire, therefore, that the language of the accompanying claims shall be accorded the broadest reasonable construction and shall be limited only by what is expressely stated therein and by the prior art.

I claim the following as my invention:

1. A self-protected semiconductor current control device comprising a tubular casing of an electric insulating material, a pair of metallic terminal elements closing the ends of said casing, a semiconductor rectifier device arranged inside said casing, a fusible element adapted to protect said rectifier device against excessive currents arranged inside said casing, conductor means arranged inside said casing for serially connecting said pair of terminal elements, said semiconductor rectifier device and said fusible element into an electric circuit, and a pulverulent quartz filler inside said casing in physical contact with said semiconductor rectifier device and in physical contact with said fusible element, said quartz filler being adapted to perform the dual function of an effective absorber and dissipator of heat generated in said semiconductor rectifier device while performing the current carrying duty thereof and being adapted to form an effective de-ionizer for the products of arcing formed incident to fusion of said fusible element.

2. A self-protected semiconductor rectifier unit comprising a tubular casing of insulating material, a pair of terminal elements closing the ends of said casing, conductor means conductively interconnecting said pair of terminal elements, said conductor means including a semiconductor diode and a fusible element connected in series with said diode and adapted to fuse in response to a breakdown of said diode, and a pulverulent quartz filler inside said casing in physical engagement with said diode to effectively withdraw from said diode heat generated in said diode, and said filler being arranged in the path of the products of arcing formed upon fusion of said fusible element to de-ionize said products of arcing.

3. A self-protected semiconductor control device comprising a tubular casing of an electric insulating material having a relatively high thermal conductivity, a pair of metallic terminal elements closing the ends of said casing, conductor means inside said casing conductively interconnecting said pair of terminal elements, said conductor means including a fusible element and a semiconductor rectifier connected in series with said fusible element, and a quartz filler having a relatively high thermal conductivity arranged inside said casing in physical engagement with said rectifier and in physical engagement with said casing to effectively transfer heat generated in said rectifier device from said rectifier to said casing, and said quartz filler being arranged immediately adjacent the space occupied by said fusible element to deionize the products of arcing formed upon fusion of said fusible element.

4. A self-protected semiconductor current control device comprising a tubular casing of a resin-glass-cloth laminate, a pair of metal ferrules mounted on the ends of said casing closing said casing, conductor means inside said casing conductively interconnecting said pair of ferrules, said conductor means including a fusible element and a semiconductor rectifier connected in series with said fusible element, and a pulverulent quartz filler arranged inside said casing in close proximity to said fusible element to de-ionize the products of arcing formed upon fusion of said fusible element, said quartz filler filling the space between said rectifier and said casing to effectively transfer heat generated in said rectifier from said rectifier to said casing.

5. A self-protected semiconductor current control device comprising a tubular casing of an electric insulating material, a pair of metallic terminal elements closing the ends of said casing, conductor means conductively interconnecting said pair of terminal elements, said conductor means including a fusible protective device and a serially connected semiconductor rectifier device both arranged inside said casing, said fusible protective device including a plate of an electric insulating material having a transverse bore and a silver wire threaded through said bore, a pulverulent quartz filler inside said casing embedding said fusible protective device and said semiconductor rectifier device, and a body of a normally solid organic insulating material liquefying and vaporizing under the heat of an arc, said body filling and plugging said bore and separating the portion of said wire inside said bore from said filler.

6. A self-protected semiconductor current control device comprising a tubular casing of a resin-glass-cloth laminate, a pair of metal ferrules mounted on the ends of said casing closing said casing, conductor means inside said casing conductively interconnecting said pair of ferrules, said conductor means including a fusible protective device and a semiconductor rectifier device in series with said fusible protective device, said fusible protective device including a plate of electric insulating material having a transverse bore and a silver wire threaded through said bore, a pulverulent quartz filler inside said casing embedding said fusible protective device and said semiconductor rectifier device, and a body of a thermoplastic synthetic resin filling and plugging said bore and separating the portion of said wire inside said bore from said filler.

References Cited by the Examiner

UNITED STATES PATENTS

| | | | |
|---|---|---|---|
| 2,447,534 | 8/48 | Richards | 317—234 |
| 2,471,011 | 5/49 | Shapiro | 317—234 |
| 2,498,666 | 2/50 | Escoffery et al. | 317—234 |
| 2,557,793 | 6/51 | Mucher | 200—120 XR |
| 2,871,314 | 1/59 | Swain et al. | 200—123 XR |
| 2,895,031 | 7/59 | Kozacka | 200—120 |
| 2,961,593 | 11/60 | Kozacka | 200—120 XR |
| 3,005,945 | 10/61 | Salzer | 200—120 XR |

DAVID J. GALVIN, *Primary Examiner.*

SAMUEL BERNSTEIN, GEROGE N. WESTBY, *Examiners.*